United States Patent [19]

Chan et al.

[11] Patent Number: 4,506,312
[45] Date of Patent: Mar. 19, 1985

[54] APPARATUS FOR CONTROLLING THE SPEED OF A ROTATING BODY

[75] Inventors: Fred N. Chan, Atherton; Ernest E. Wuethrich, Santa Clara, both of Calif.

[73] Assignee: Ford Aerospace & Communications Corporation, Detroit, Mich.

[21] Appl. No.: 534,403

[22] Filed: Sep. 23, 1983

Related U.S. Application Data

[63] Continuation of Ser. No. 356,571, Mar. 9, 1982, abandoned.

[51] Int. Cl.$^3$ .................................................. G01P 3/44
[52] U.S. Cl. .................................... 361/240; 361/242; 364/565; 244/164
[58] Field of Search .................... 361/239, 240, 242; 364/565, 426; 244/170, 164, 165; 303/94, 95; 180/178, 179; 340/670

[56] References Cited

U.S. PATENT DOCUMENTS 3,798,907  3/1974  Barrett et al. .................. 361/240 X
4,083,423  4/1978  Williams et al. ................ 361/240 X
4,323,976  4/1982  Radaelli et al. .................... 364/565

*Primary Examiner*—Reinhard J. Eisenzopf
*Attorney, Agent, or Firm*—Robert D. Sanborn; Edward J. Radlo; Kenneth R. Allen

[57] ABSTRACT

A closed-loop system for precisely regulating the speed of an electrically driven rotating body. A tachometer rotor, mechanically linked to the rotating body, is provided with p "teeth" around its periphery. A sensor produces a pulse signal upon passage of each of these teeth, to generate a cyclical tachometer signal having a frequency p times the frequency of rotation. A tachometer counter counts this signal and produces a single output pulse after every n×p pulses from the sensor, such that the same one of the p teeth is responsible for triggering each of the successive output pulses, and variations in spacing between teeth do not cause variations in the period of the counter output. A high frequency clock is counted by a second counter, which transfers its count to a storage register and resets upon each pulse from the tachometer counter, such that the count held by the storage register is a continuously updated, highly accurate digital representation of the period of the rotating body. A period comparator derives a speed control signal which is proportional to the inverse of the difference between the count and a digital speed command signal representative of the rotational period of the desired rotational speed.

15 Claims, 3 Drawing Figures

APPARATUS FOR CONTROLLING THE SPEED OF A ROTATING BODY

This is a continuation of application Ser. No. 356,571, filed Mar. 9, 1982, now abandoned.

BACKGROUND OF THE INVENTION

The present invention relates generally to the field of devices for controlling the speed of rotating bodies. More particularly, the present invention concerns an apparatus for controlling the speed of an electrically driven momentum wheel in an inertial guidance system. Specifically, the invention is embodied in a closed loop speed control system capable of regulating speed to an accuracy of better than 0.0035%.

A great variety of electrical and electronic devices for controlling and regulating the speed of rotating mechanisms has evolved. Analog systems generating an electrical signal which has a magnitude proportional to the speed of the rotating body, comparing this signal with a reference signal, and employing a closed loop feedback control system to vary the speed of the rotating body to reduce the difference or error signal have been in existence from a time prior to solid state electronics.

More recently, with the advent of inexpensive integrated digital circuitry, a new generation of speed controllers has evolved. Typically, the sophistication and circuit complexity which can be simply realized with the use of such integrated digital components has made possible improvements in the accuracy and stability with which rotational speed can be regulated.

However, there remain applications for speed control mechanisms which set such high requirements for regulation accuracy as to challenge the existing regulator designs. One such application is in inertial guidance systems for satellite spacecraft, where a plurality of momentum wheels oriented along different axes of rotation are used to orient the spacecraft antenna system with a ground station antenna system to a very high degree of accuracy. In order to alter or correct the orientation of the spacecraft, the momentum wheels must be speeded up or slowed down, while to maintain a given orientation, these wheels must be maintained at a well-regulated controlled speed.

DESCRIPTION OF THE PRIOR ART

U.S. Pat. No. 3,539,897 issued on Nov. 10, 1970 to M. R. Sommeria, and covers a servo controlled system for controlling the position of a machine tool or part thereof, under an automated or numerical control program. Information about the velocity of movement of the machine is derived from a tachometer attached thereto, but such information is only used to critically control the damping of the system, such that machine position lags programmed position to the least degree possible.

U.S. Pat. No. 3,559,018 issued on Jan. 26, 1971 to J. A. Fournier, and details a two-loop servo control system for controlling the speed of a motor. The system relies principally on an analog control loop, but provides a secondary digital control loop for correcting the analog loop to provide increased accuracy over a critical motor speed range.

U.S. Pat. No. 3,626,257 issued on Dec. 7, 1971 to E. P. Morse, and covers a circuit for measuring and servomechanically controlling the rotational speed of extremely slowly rotating shafts. The method involves the derivation of a control signal from both instantaneous shaft speed and shaft position signals.

U.S. Pat. No. 3,748,533 issued on July 24, 1973 to R. F. South, and covers an electronic tachometer in which pulses from a transducer connected to the rotating apparatus are counted during a pre-established time period, such that the count is directly proportional to the rotational speed.

U.S. Pat. No. 4,050,747 issued on Sept. 27, 1977 to Ruhnau et al., describes and claims a wheel speed measuring circuit in which a sinusoidal signal from a sensor is converted into a square wave, and errors in the signal resulting from mechanical imperfections in the sensor are compensated by deriving separate counts of the positive- and negative-going transitions of the square wave.

U.S. Pat. No. 4,056,287 issued Nov. 1, 1977 to W. Gudat, and details a wheel speed measuring circuit in which a count is derived which is representative of the length of one half cycle of the sinusoidal voltage produced by the wheel sensor, while the frequency being counted is varied as an exponential function of wheel period, such that an adequately large count to ensure the desired resolution can be derived even at low wheel speeds.

U.S. Pat. No. 4,072,364 issued Feb. 7, 1978 to W. Gudat et al., and covers a wheel speed measuring circuit similar to the immediately preceding reference, excepting that errors resulting from mechanical imperfections in the speed sensor are compensated by comparing the counts deriving from the positive and negative cycles of the sensor waveform.

U.S. Pat. No. 4,125,295 issued Nov. 14, 1978 to Ruhnau et al., and details a wheel speed measuring circuit in which the speed range over which the circuit can be utilized is varied by varying the frequency of a counted signal in accordance with the wheel speed, or by varying the time duration during which the count is accumulated.

SUMMARY OF THE INVENTION

A principal object of the present invention is the provision of an apparatus for precisely regulating the speed of a rotating body to a preselected commanded speed;

A second object of the present invention is the provision of a digital electronic circuit for precisely measuring and regulating the speed of an electrically driven rotating body;

A third object of the present invention is the provision of such an electronic circuit having improved bandwidth and stability;

A fourth object of the present invention is the provision in an electronic speed control circuit of an improved tachometer means for generating a periodic electrical pulse signal representative of the speed of a rotating body;

A fifth object of the present invention is the provision in such a tachometer means of a tachometer counter for providing a periodic electrical pulse signal which is independent of mechanical imperfections in a tachometer signal generating means;

A sixth object of the present invention is the provision of a free-running counter means for continuously producing a digital electrical signal which is a numerical representation of the period of the rotating body during the most recent measuring period;

To the above ends, a speed monitoring and control apparatus according to the present invention includes a tachometer rotor mechanically coupled to the rotating body and having a plurality p of sensible poles spaced about the periphery thereof for generating a tachometer electrical signal by means of a sensor. A tachometer counter produces an output pulse signal for each n×p cycles of the tachometer signal where n is an integer, such that each pulse of the output signal is triggered by the passage of the same one of the p sensible poles, and variations in the spacing of the poles do not affect the output period of the tachometer counter.

A free-running counter counts at a fixed frequency during each period of the tachometer counter, and thus accumulates a count which is an accurate representation of the length of the period. At the end of each period of the tachometer counter, the count is transferred into a buffer register, and the free-running counter is then reset, such that the buffer register always contains a numerical representation of the count at the end of the most recent period of the tachometer counter.

This numerical representation is compared with a numerical reference signal representative of the desired speed in an arithmetic-and-logical unit, and an error signal is produced. A speed control means responds to the error signal by varying the speed of the rotating body in a sense to minimize the error.

The above and other features, objects and advantages of the present invention, together with the best mode contemplated by the inventors thereof for carrying out their invention will become more apparent from reading the following detailed description of a preferred embodiment of the invention while studying the drawing, the various figures of which represent the following:

DETAILED DESCRIPTION OF A PREFERRED EMBODIMENT

Figure 1:
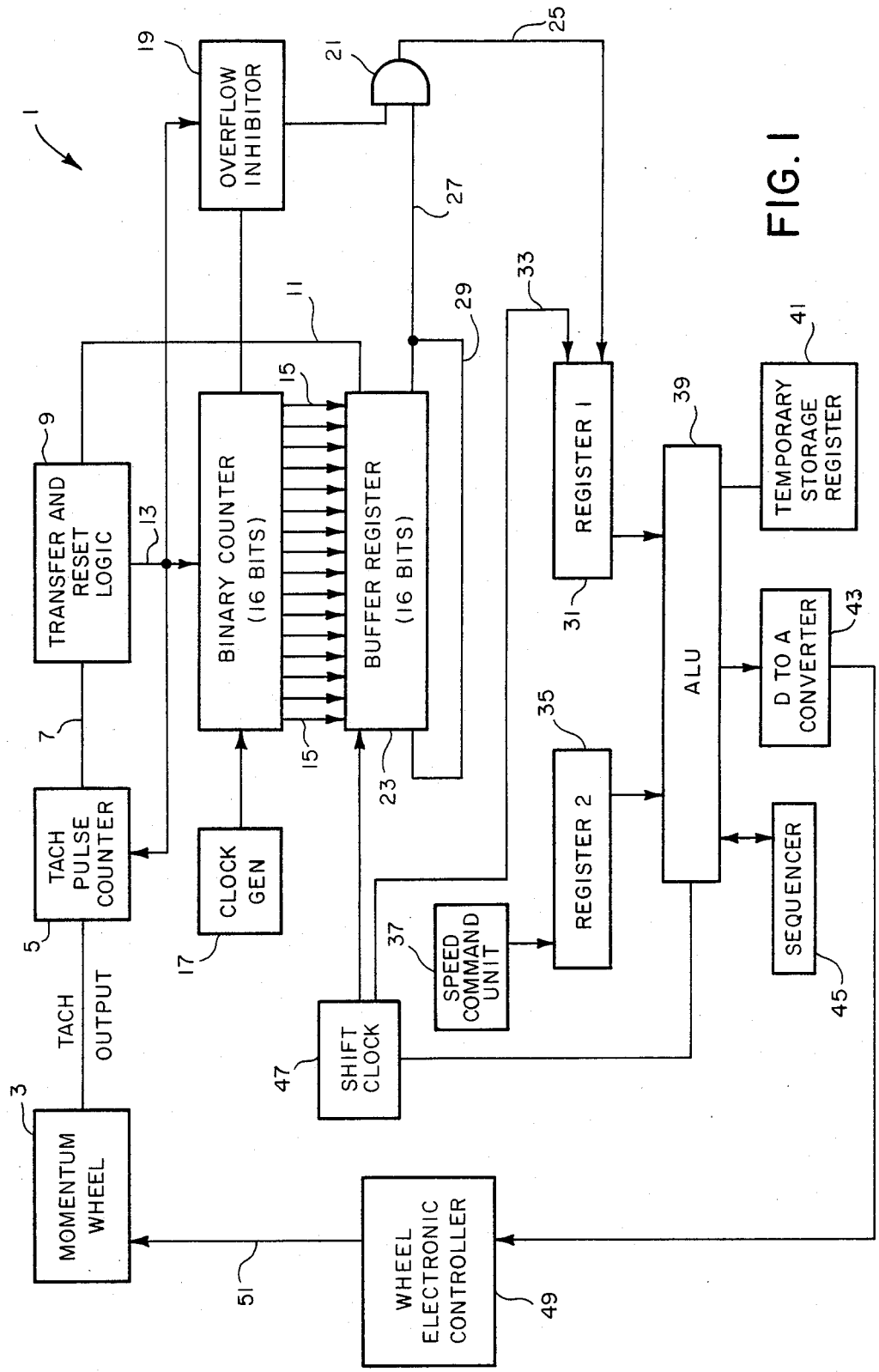
FIG. 1 is a detailed schematic drawing in block diagram form of an electrical speed control apparatus according to the present invention.

In FIG. 1, an electronic apparatus for controlling the speed of a rotating body to a high degree of accuracy is illustrated in block schematic form, and is designated generally by numeral 1. Apparatus 1 may be used to regulate the speed of a momentum wheel, as indicated by numeral 3, for example, although the apparatus will find many other uses in speed regulation as well.

Therefore, understanding that momentum wheel 3 is merely representative of a large variety of rotating bodies whose speed must be precisely controlled and made to conform to a commanded, variable speed, the means for accomplishing this end will now be described. Within the block labeled momentum wheel 3 is a tachometer which is not shown in FIG. 1, but will be described later in some detail with respect to FIG. 2. For now, it may be noted that the function of this tachometer is to output a cyclical electrical tachometer signal consisting of a series of pulses on the line labeled "tack output" in FIG. 1. This tachometer signal is counted in a tach pulse counter 5, which produces a periodic electrical pulse signal on line 7, to provide an input to a transfer and reset logic circuit 9.

As will be explained later with respect to FIGS. 2 and 3, the tachometer signal at the input to counter 5 has a frequency which is an integral multiple p, times the frequency of rotation of momentum wheel 3. Counter 5 counts this incoming tachometer signal, and outputs a single pulse on line 7 after each n×p cycles of the tachometer signal, such that the frequency of the periodic electrical pulse signal on line 7 is directly proportional to the frequency of the tachometer signal, being a fraction $1/(n \times p)$ thereof.

Transfer and reset logic 9 detects the leading edge of each incoming pulse of the periodic electrical pulse signal on line 7, and produces in response to each pulse of this signal a transfer pulse on line 11, and a reset pulse on line 13.

A counter 14, which might be a 16-bit digital counter for example, counts the output of a free-running, fixed-frequency clock generator 17, producing a frequency of, for example, 1 MHz. Counter 14 provides a 16-bit numerical representation of the accumulated count on sixteen corresponding output lines 15 to a buffer register 23. The transfer pulse produced on line 11 by transfer and reset logic circuit 9 immediately following each pulse on line 7 "clocks" the signal present on lines 15 into register 23, whereupon counters 14 and 5 are immediately reset.

Consequently, register 23 always contains the numerical representation of the count obtained at the end of the most recent period of the periodic signal on line 7. Further, since the period of the signal on line 7 is an integral multiple of the period of the rotating body represented by momentum wheel 3, that signal present within register is proportional to the period of wheel 3.

From the foregoing, it will be apparent that the tachometer present within block 3 of FIG. 1 and tach pulse counter 5 together comprise a tachometer means for deriving a periodic electrical pulse signal having a period which is inversely proportional to the rotational frequency of the rotating body, while transfer and reset logic circuit 9, clock generator 17, counter 14 and buffer register 23 together comprises a free-running counter means for continuously producing a digital electrical signal which is a numerical representation of the period of rotation of the rotating body during the most recent measuring period.

In the remaining circuitry of FIG. 1, the numerical representation of the period of momentum wheel 3 is compared with a command reference signal to determine the difference therebetween, and to correspondingly correct the speed of wheel 3. For this purpose, a register output line 27 is connected by means of an AND gate 21 to the input line 25 of a storage device 31, labeled register 1 in FIG. 1. A speed command unit 37 generates a digital speed reference signal in the form of a 16-bit representation of the corresponding period of the rotating body represented by momentum wheel 3. Speed command unit 37 could be a manually set control together with the circuitry needed to translate the set speed into a numerical representation of the corresponding period, or could be some form of automatic controller accepting any of a number of inputs and deriving from them the required speed, and outputting a numerical representation of the corresponding period. In either case, the reference signal from unit 37 is stored in register 2, numeral 35 in FIG. 1.

An arithmetic and logic unit 39 compares the numerical signals present in registers 1 and 2, and derives from their difference an error signal in numerical or digital form. This error signal is sent to D to A converter 43, where it is converted into an appropriate drive signal which might be a varying DC voltage which is inputted to a wheel electronic controller 49. Controller 49 controls the electrical energization supplied to momentum wheel 3, and thus varies the speed of wheel 3 so as to minimize the speed error.

Within the context of the present invention, registers 1 and 2, arithmetic and logic unit 39, and D to A converter 43 may be thought of as together comprising a period comparator means for comparing the numerical signal contained within register 23 with the reference signal produced by speed command unit 37, and deriving therefrom a proportional speed control signal.

Since there will be times when momentum wheel 3 must be started from rest, some provision to essentially disable the speed control functions of the circuit of FIG. 1 is desirable. Since counter 14 will overflow during wheel startup because of the very long wheel period during these times, an overflow inhibitor 19 has been provided to prevent the false readings which result from overflow from causing malfunction of the apparatus.

Overflow inhibitor 19 is connected to counter 14 to sense an overflow thereof, whereupon inhibitor 19 puts out a logic "0" to AND gate 21, thus inhibiting the transmission of false period data to register 1.

A shift clock 47 is used to "clock" the 16 bits of data serially out of register 23 and into register 1 at, for example, a 500 kHz transfer rate. In order that the same sixteen bits of data are replaced in register 23, such that the register does not at any time contain a false reading of zero, a data recycle line 29 is provided.

Should overflow occur at very low startup speeds, shift clock 47 will clock a 16-bit underspeed signal into register 1. In the illustrated embodiment, this underspeed signal will be a string of 16 "0's". Upon this occurrence, unit 39 will respond by producing a "full torque" control signal, representing a maximum error signal to controller 49. In this regard, the importance of providing data recycle line 29 becomes clear. Without this line, a false full torque demand might be outputted by unit 39 to controller 49 during normal operation of the circuit, which could result in instability.

A temporary storage register 41 serves as a "scratchpad memory" for arithmetic and logic unit 39, storing the intermediate results of calculations. A sequencer 45 controls the operation of unit 39 and shift clock 47 such as to provide the above sequence of operations, resulting in the comparison of the reference signal with the signal present in register 23, and the production of a speed control signal.

Figure 2:
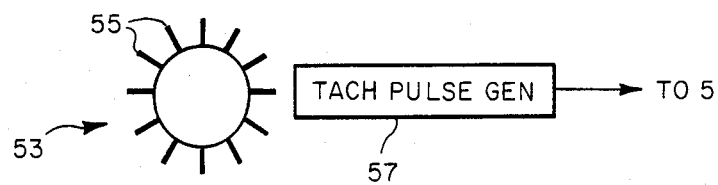
FIG. 2 is a schematic representation of tachometer means of a type useful in the present invention.
Figure 3:
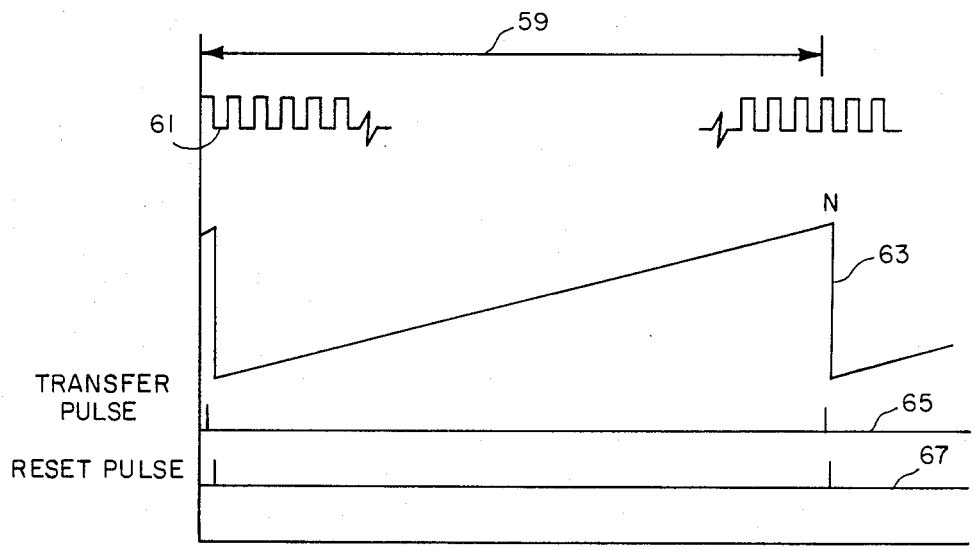
FIG. 3 is a timing diagram illustrating the relative time relationships of several of the electrical signals produced within the apparatus of FIG. 1.

Turning now to FIGS. 2 and 3, the novel signal processing aspects of the present invention which result in the cancellation of errors from mechanical imprecision in the tachometer will be explained.

FIG. 2 illustrates in a somewhat schematic way the nature of the tachometer and sensor which produce the pulse train present on the line labelled "tach output" in FIG. 1. Fundamentally, the tachometer comprises a tachometer rotor 53 which either forms an integral part of the rotating body whose speed is being regulated, or else is mechanically interconnected to it such that rotor 53 is driven at the same speed.

Substantially equispaced about the periphery of rotor 53 are a plurality of sensible poles 55, indicated generally by short radial lines in FIG. 2. These poles might be the poles of a magnet or magnets in one variety of tachometer, might be alternating bands which are more or less reflective of light or other radiation, or any other form of sensible or distinguishable regions spaced about the periphery of rotor 53 for the purpose of deriving an electrical signal having a frequency proportional to rotational speed.

A tachometer sensor in the form of a tach pulse generator 57 in close proximity to the sensible poles 55 of rotor 53 senses the passages of each pole as rotor 53 turns, and produces in response thereto a single output pulse on the line labeled "to 5" in FIG. 2. The exact nature of tach pulse generator 57 will, of course, vary according to the nature of sensible poles 55, but it might be based upon a Hall-effect sensor, or some variety of photocell, etc.

Although the varieties of tachometer represented generally by FIG. 2 are simple and fairly reliable, they are subject to error due to slight unevenness in the spacing of the sensible poles 55. Although careful machining and other precautions can reduce the slight variations in spacing between poles 55, a certain amount of error will always remain. In systems required to control speed to within 35 parts per million, the required accuracy of spacing of poles 55 is nearly impossible to produce.

According to the present invention, these errors can be prevented from affecting the performance of the speed control apparatus if the period of the rotating body is always measured as the time elapsed between movements past the sensor 57 of the same tooth. In this way, variations in spacing of the teeth will have no bearing on the result.

Turning now to FIG. 3, the time relationship of the various signals required in the present invention will be discussed.

In FIG. 3, 61 represents the signal present on the line labeled tack output in FIG. 1, and is the output of tach pulse generator 57 in FIG. 2. Dimension line 59 in FIG. 3 represents an integral multiple of the period of the rotating body, and might for example be the time required for 3 revolutions thereof. Consequently, if p represents the number of sensible poles on the periphery of rotor 53, and n represents an integer such as 3, then n×p cycles of waveform 61 will occur within the period represented by line 59. In the case of a rotor having 12 sensible poles, then, 3 complete revolutions of rotor 53 will produce exactly 36 cycles of waveform 61.

Accordingly, if tach pulse counter 5 in FIG. 1 were set to generate an electrical pulse signal on line 7 after every 36 pulses of input signal, then the occurrence of pulse signal on line 7 would always be occasioned by the passage of the same one of poles 55 past tach generator 57 in FIG. 2. In practice, this is exactly the arrangement employed by the present invention for the elimination of the pulse-to-pulse jitter which so often plagued the prior art tachometer circuits.

Characteristics 63 in FIG. 3 represents the successive accumulation of the count in counter 14 throughout the period established by tach pulse counter 5. At the end of each such period, transfer and reset logic 9 generates first a transfer pulse as shown on characteristic line 65. This transfer pulse is on line 11 in FIG. 1, and serves to clock the count from counter 14 into register 23, as already explained above. The transfer pulse is followed immediately by the reset pulse on characteristic 67. The reset pulse resets the count 63 to zero, and also resets tach pulse counter 5 and overflow inhibitor 19.

The timing differences among these signals have been greatly exaggerated in FIG. 3, while in practice the entire transfer and reset opertion can take place in a time on the order of one microsecond. Consequently, it is possible to transfer and reset within approximately one count of the 1 MHz clock 17 in FIG. 1, such that the count is carried out on a substantially continuous basis. Because of this "pipeline" data approach, the circuit of FIG. 1 has proven capable of an accuracy on the order of 35 parts per million or better, and possesses wider bandwidth and greater stability than the prior art approaches as well.

Although this invention has been described with some particularity with reference to particular embodiments which comprise the best mode known to the inventors for carrying out their invention, many modifications could be made and many alternative embodiments could thus be derived without departing from the scope of the invention. Consequently the scope is to be derived only from the following claims.

What is claimed is:

1. Apparatus for controlling the speed of a rotating body, comprising:
    tachometer means mechanically coupled to said rotating body to sense cyclic passage of a specific angular index of rotation relative to a position of a reference thereby to eliminate pulse-to-pulse jitter for generating a periodic electrical pulse signal, said periodic electrical pulse signal having a period which is an integral multiple of the period of rotation of said angular index, which period is inversely proportional to the rotational frequency of said body;
    free-running counter means operative at a fixed clock frequency substantially greater than said rotational frequency and connected to receive said periodic pulse signal of said tachometer means for continuously counting at said fixed frequency and accumulating a count value throughout each said period of said periodic pulse signal, said counter means being operative to respond to each said periodic pulse signal by resetting said count value to zero and being operative to continuously produce a digital electrical signal which is a numerical representation of said count value at the end of the most recent period of said periodic pulse signal and which is precisely indicative of time length of said periodic pulse signal period;
    means for producing a command digital reference signal representative of a desired time length of said periodic pulse signal period;
    period comparator means for comparing said digital electrical signal with said command digital reference signal, and for generating in response to a measured difference therebetween a speed control signal having a magnitude representative of said difference; and
    speed control means connected to said period comparator means to vary the rotational speed of said rotating body in response to said speed control signal in a sense to continuously minimize said difference between said digital electrical signal and said digital reference signal.

2. The apparatus according to claim 1 wherein said free-running counter means includes a buffer register coupled to receive an accumulated count in parallel for storing said count at the end of each period of said periodic pulse signal.

3. The apparatus of claim 2 wherein said counter means comprises transfer and reset means connected to receive said periodic electrical pulse signal and to respond thereto by: (1) causing said count to be transferred to said buffer register, and (2) causing said counter means to be reset to a preset initial condition.

4. The apparatus of claim 3 wherein said counter means includes counter overflow detector means to detect counter overflow and, in response thereto, to transmit an underspeed digital electrical signal to said comparator means.

5. The apparatus of claim 4 wherein said period comparator means comprises a first register coupled to said buffer means and to said counter overflow detector means for storing said digital electrical signal, a second register for storing said digital reference signal, an arithmetical-and-logical means for comparing said digital electrical signal with said digital reference signal to produce a digital error signal, and a digital-to-analog converter means to produce said speed control signal in response to said digital error signal.

6. The apparatus according to claim 2 wherein said counter means includes counter overflow detector means to detect counter overflow, and, in response thereto, to transmit an underspeed periodic electrical signal to said comparator means.

7. The apparatus according to claim 6 wherein said period comparator means comprises a first register coupled to said buffer means and to said counter overflow detection means for storing said digital electrical signal, a second register for storing said digital electrical signal, a second register for storing said digital reference signal, an arithmetical-and-logical means for comparing said digital electrical signal with said digital reference signal to produce a digital error signal, and a digital-to-analog converter means to produce said speed control signal in response to said digital error signal.

8. Apparatus for controlling the speed of a rotating body comprising:
    tachometer means mechanically coupled to said rotating body to sense cyclic passage of a specific angular index of rotation relative to a position of a reference thereby to eliminate pulse-to-pulse jitter for generating a periodic electrical pulse signal, said periodic electrical pulse signal having a period which is an integral multiple of the period of rotation of said angular index, which period is inversely proportional to the rotational frequency of said body;
    free-running counter means operative at a fixedclock frequency substantially greater than said rotational frequency and connected to receive said periodic electrical pulse signal of said tachometer means for continuously counting at said fixed frequency and accumulating said count value throughout each said period of said periodic electrical pulse signal, said counter means being operative to respond to each said periodic electrical pulse signal by resetting said count value to zero and being operative to continuously produce a digital electrical signal which is a numerical representation of said count value at the end of the most recent period of said periodic electrical pulse signal and which is precisely indicative of time length of said periodic electrical pulse signal period;

means for producing a command digital reference signal representative of a desired time length of said periodic electrical pulse signal period;

comparator means for comparing said digital electrical signal with said command digital reference signal and for generating in response to a measured difference therebetween a speed control signal having a magnitude representative of said difference;

speed control means connected to said period comparator means to vary the rotational speed of said rotating body in response to said speed control signal in a sense to continuously minimize said difference between said digital electrical signal and said digital reference signal;

wherein said tachometer means comprises a tachometer rotor mechanically coupled to said rotating body for synchronous rotation therewith, and a tachometer sensor coupled to said reference position adjacent and in close proximity to the periphery of said rotor, said rotor having a plurality of sensible poles periodically spaced about the periphery thereof, said tachometer sensor having sensing means therewithin to respond to the passage of each said sensible pole by producing corresponding electrical output pulses wherein one of said sensible poles is designated as said specific angular index of rotation, and wherein the electrical output pulse corresponding to said specific angular index of rotation is said periodic electrical signal.

9. In an apparatus for controlling the rotational speed of a rotating body by the method of producing an output periodical electrical signal, comparing said output periodical electrical signal with a reference signal, deriving an error signal, and altering the rotational speed in a sense to minimize said error signal, a means for producing a plurality of output periodical electrical signals from periodic pulse signals, each said output periodical electrical signal corresponding to a period measurement which is inversely proportional to the rotational frequency of said body, comprising:

a tachometer means including (1) a tachometer rotor for coupling directly to said rotating body to rotate synchronously therewith, said rotor having a plurality, p, of sensible poles spaced at arbitrary positions about said rotor;

(2) tachometer sensor means responsive to movement of each of one said poles relative to said sensor means and producing in response thereto an input electrical signal having one cycle of alternation for each said pole passing said sensor means, whereby said sensor means produces a cyclical electrical signal having a frequency, p, times the rotational frequency of said rotating body, and (3) counter means including a first pulse counter and control means, said first pulse counter being connected to said sensor means and being operative to produce a plurality, p, of pole counts, each one of said pole counts corresponding to the passage of one of said poles past said sensor means, said control means being coupled to receive output of said first pulse counter and to derive successively from said output of said first counter said periodic pulse signals, each one of said periodic pulse signals being generated at an exact integral multiple of a rotation cycle of said tachometer rotor; and clock counter means, including a second clock counter, and clock means, said clock means having a clock rate substantially greater than the rate of said p clock counts, said second clock counter being coupled to said control means and to said clock means to count clock cycles between said periodic pulse signals to produce said output periodical electrical signal for each n×p cycles of input signal where n is an integer, whereby successive output pulse signals are produced in response to the passage by the sensor means of the same one of the p poles and variations in interpole spacing do not cause variations in the period of each of the periodic pulse signals and said output periodical electrical signals represent precise measurement of each period.

10. The apparatus according to claim 9 wherein said counter means includes a buffer register coupled to receive an accumulated count in parallel for storing said count at the end of each period of said periodic pulse signal.

11. The apparatus of claim 10 wherein said counter means further comprises transfer and reset means connected to receive said periodic electrical pulse signal and to respond thereto by: (1) causing said count to be transferred to said buffer register, and (2) causing said counter means to be reset to a preset initial condition.

12. The apparatus of claim 9 wherein said counter means includes counter overflow detector means to detect counter overflow, and in response thereto, to transmit an underspeed digital electrical signal to said comparator means.

13. The apparatus of claim 12 wherein said period comparator means comprises a first register coupled to said buffer means and to said counter overflow detector means for storing said digital electrical signal, a second register for storing said digital reference signal, an arithmetical-and-logical means for comparing said digital electrical signal with said digital reference signal to produce a digital error signal, and a digital-to-analog converter means to produce said speed signal in response to said digital error signal.

14. An apparatus for controlling the speed of a rotating body comprising:

tachometer means mechanically coupled to said rotating body to send cyclic passage of a specific angular index of rotation relative to a position of a reference thereby to eliminate pulse-to-pulse jitter for generating a periodic electrical pulse signal, said periodic electrical pulse signal having a period which is an integral multiple of the period of rotation of said angular index, which period is inversely proportional to the rotational frequency of said body;

free-running counter means operative at a fixed-clock frequency substantially greater than said rotational frequency and connected to receive said periodic pulse signal of said tachometer means for continuously counting at said fixed frequency and accumulating a count value throughout each said period of said electrical pulse signal, said counter means being operative to respond to each said periodic electrical pulse signal by resetting said count value to zero and being operative to produce a digital electrical signal which is a numerical representation of said count value at the end of the most recent period of said periodic electrical pulse signal and which is precisely indicative of time-length of said periodic output pulse signal period;

means for producing a command digital reference signal representative of a desired time length of said periodic electrical pulse signal period;

period comparator means for comparing said digital electrical signal with said command digital reference signal and for generating in response to a measured difference therebetween a speed control signal having a magnitude representative of said difference;

speed control means connected to said period comparator means to vary the rotational speed of said rotating body in response to said speed control signal in a sense to continuously minimize said difference between said digital electrical signal and said digital reference signal; and wherein said free-running counter means includes a buffer register coupled to receive an accumulated count in parallel for storing said count at the end of each period of said periodic electrical pulse signal.

15. The apparatus according to claim 14 wherein said counter means comprises transfer and reset means connected to said receive said periodic electrical pulse signal and to respond thereto by: (1) causing said count to be transferred to said buffer register, and (2) causing said counter means to be reset to a preset initial condition.

* * * * *